(12) United States Patent
Chen (10) Patent No.: US 10,296,289 B2
(45) Date of Patent: May 21, 2019

(54) MULTIMODAL COMMANDS

(71) Applicant: salesforce.com, inc., San Francisco, CA (US)

(72) Inventor: Peng-Wen Chen, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/611,278

(22) Filed: Jun. 1, 2017

(65) Prior Publication Data
US 2018/0349092 A1    Dec. 6, 2018

(51) Int. Cl.
  G06F 3/16      (2006.01)
  G10L 15/22     (2006.01)
  G06F 3/0481    (2013.01)

(52) U.S. Cl.
  CPC ............ *G06F 3/167* (2013.01); *G06F 3/0481* (2013.01)

(58) Field of Classification Search
  CPC ................................ G06F 3/167; G06F 3/0481
  See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |

(Continued)

OTHER PUBLICATIONS

Chen et al.; The Integration Method of Multimodal Human-Computer Interaction Framework; 2016 8th International Conference on Intelligent Human-Machine Systems and Cybernetics (IHMSC); Year: 2016, vol. 02; pp. 545-550. (Year: 2016).*

(Continued)

*Primary Examiner* — Abul K Azad
(74) *Attorney, Agent, or Firm* — Lowenstein Sandler LLP (57) ABSTRACT

Technology for detecting multimodal commands that enhance the human-computer interaction of a computing device. In an illustrative implementation, a computing device may receive multiple input events from a plurality of input devices. The plurality of input devices may each correspond to a different computer input modalities and the computing device may correlate the input events across different modalities. The computing device may keep the input events in their native form (e.g., input device specific) or may transform the input events into modality independent events. In either example, the computing device may determine the events satisfy a definition for a multimodal command that identifies multiple events from different computer input modalities. Responsive to the determination, the computing device may invoke the multimodal command on the client device to perform one or more computing operations.

16 Claims, 4 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,674,426 B1 * | 1/2004 | McGee ................. G06F 3/038 178/18.01 |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson |
| 8,176,438 B2 * | 5/2012 | Zaman ................. G06F 3/0481 715/786 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0172191 A1 * | 9/2004 | Vitikainen ............. G01C 21/32 701/426 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2013/0144629 A1 * | 6/2013 | Johnston ................. G06F 3/167 704/275 |

OTHER PUBLICATIONS

Sun et al.; An Efficient Multimodal Language Processor for Parallel Input Strings in Multimodal Input Fusion; International Conference on Semantic Computing (ICSC 2007);Year: 2007; pp. 389-396. (Year: 2007).*

* cited by examiner

MULTIMODAL COMMANDS

COPYRIGHT NOTICE

Portions of the disclosure of this patent document may contain material subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to human-computer interactions and, more specifically, to interactions that initiate a command in view of user input over multiple different modalities (e.g., visual, auditory, tactile).

BACKGROUND

Humans interact with computers using a variety of different input and output devices. The input devices enable a human to communicate with a computer and the output devices enable the computer to communicate with the human. The two-way communication is often referred to as human-computer interactions (HCI). The human-computer interactions may occur over different modalities, which often correspond to the human senses of sight, hearing, and touch. The human-computer interaction enables a human to provide an input to initiate the computer to perform a command or operations. For example, there may be a particular combination of inputs that are used to initiate a particular command. The use of a combination of inputs may enable a much larger quantity of unique commands and may enhance the human-computer interactions. The combination of input is typically received over the same modality since different modalities may be handled by different input devices and associated computing logic.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, computer-readable storage media and methods according to the disclosed implementations are described in this section. The examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Implementations of multimodal command detection technology are provided herein and may enhance the human-computer interactions that occur between a user and a computing device. The technology may enable the creation and use of multimodal commands that are initiated in response to user input received over multiple different modalities. The modalities may include a visual modalities, auditory modalities, tactile modalities, kinesthetic modalities, other modalities, or a combination thereof. The computing device may include one or more human input devices (e.g., camera, microphone, touchpad) that sense user input over different modalities and generate one or more corresponding input events. The input events generated by different human input devices may be processed at different speeds using different techniques. The variations in the processing of the input events originated from different modalities may make it challenging to detect when a multimodal command should be invoked.

Aspects of the present disclosure may address the above noted and other deficiencies by introducing technology for multimodal command detection. In an illustrative implementation, a computing device may receive multiple input events from a plurality of input devices. The plurality of input devices may each correspond to a different computer input modality and the computing device may correlate input events from different modalities. The correlation may be based on when the user input was initiated, received, processed, or combination thereof. The computing device may keep the input events in their native form (e.g., input device specific) or may transform the input events into modality independent events. In either example, the computing device may determine the events satisfy a definition for a multimodal command that identifies multiple events from the different computer input modalities. Responsive to the determination, the computing device may invoke the multimodal command on the client device to perform one or more computing operations.

Figure 1:
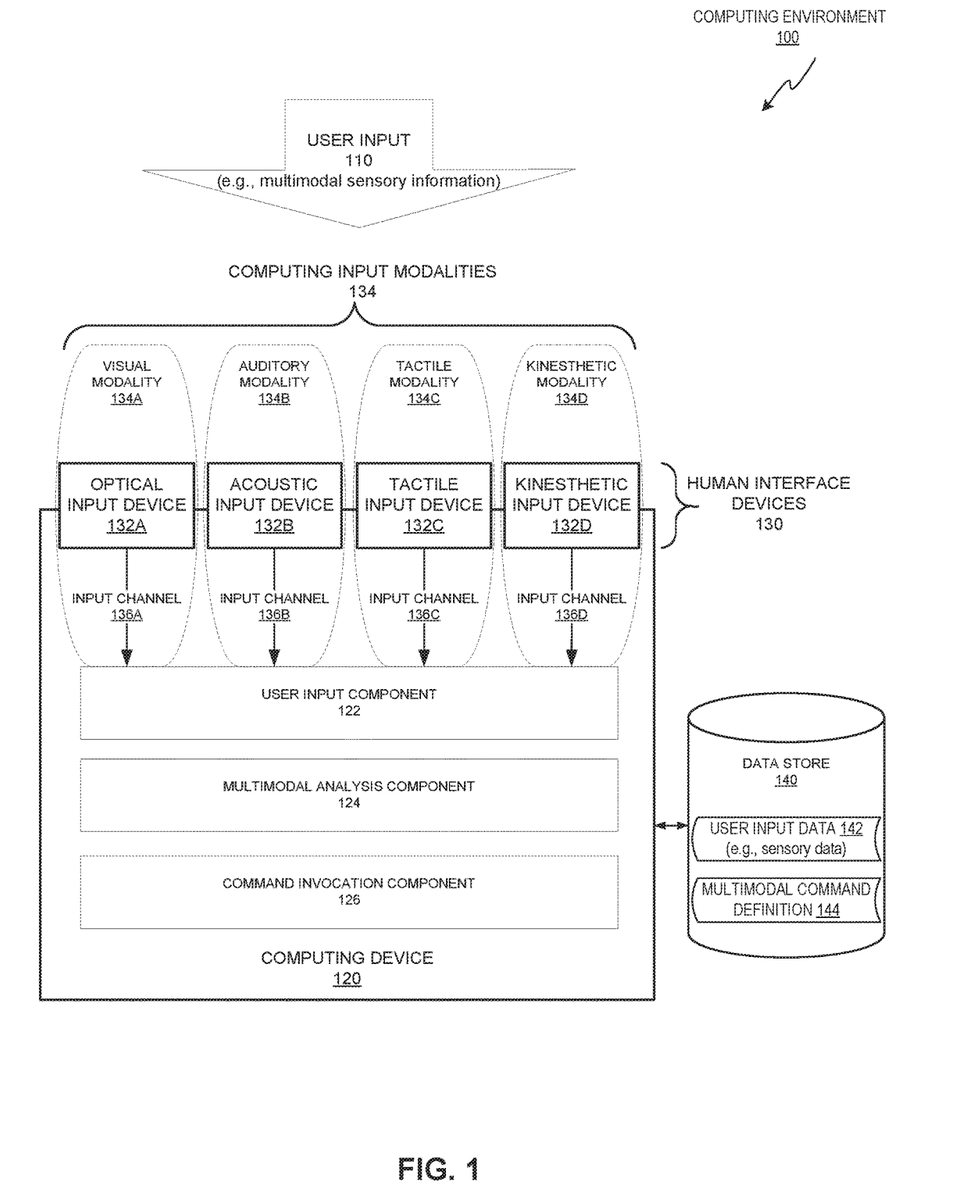
FIG. 1 is a block diagram illustrating an exemplary computing environment with a computing device that supports multimodal commands according to some implementations.

FIG. 1 is a block diagram illustrating an exemplary computing environment 100 that includes one or more computing devices that are capable of receiving user input over a plurality of different modalities and detecting when the user input corresponds to one or more multimodal commands. Computing environment 100 may include user input 110, a computing device 120, a plurality of human interface devices 130, and a data store 140.

User input 110 may be any input that originates from an action of a user. The input may include visual input, audio input, touch input, motion input, other input, or a combination thereof. The actions of the user may involve any part of the user's body and a single action may result in user input being received by computing device 120 over a single modality (e.g., unimodal input) or over multiple modalities (e.g., multimodal input). In one example, a single action may involve a user enunciating a word (e.g., speaking) and may result in multimodal input because both visual input (e.g., mouth moving) and acoustic input (e.g., audio speech) may be received by computing device 120. In another example, a user may perform a first action that involves tactile input (e.g., keyboard entries, mouse click) and may perform a second action that involves optical input (e.g., hand gesture). The second action may be before, during, or after the first action and both the first action and the second action together may be considered user input 110. The user's actions and corresponding input may be received as continuous or discreet input and may occur simultaneously (e.g., concurrently), serially (e.g., sequentially), or a combination thereof. User input 110 may be multimodal input and may involve any combination of computing input modalities 134 that are received and interpreted by computing device 120.

Computing device 120 may be a desktop computer, laptop computer, mobile phone, tablet computer, other computing device, or a combination thereof. In some implementations, computing device 120 may be referred to as a "user device," "client device," "computer device," "server device" other variation, or a combination thereof. In the example shown in FIG. 1, computing device 120 may include a user input component 122, a multimodal analysis component 124, a command invocation component 126, and a plurality of human interface devices 130.

User input component 122 may interact with one or more human interface devices 130 to capture user input 110. User input 110 may include multimodal input that is from multiple different computing input modalities 134. User input component 122 may receive the input over one or more input channels 136A-D and may store the user input as user input data 142. In one example, each of the input channels 136A-D may correspond to a particular computing input modality 134 or may correspond to a particular human interface device 130. For example, input channel 136C may correspond to all input devices related to the tactile modality (e.g., both mouse and keyboard) or may alternatively only correspond a single input device of the tactile modality (e.g., either mouse or keyboard). In other examples, multiple input channels may be consolidated into less input channels (e.g., a single input channel) or one of the input channels may be separated into multiple input channels.

Multimodal analysis component 124 may analyze user input data 142 to determine whether the user input data 142 satisfies one or more multimodal command definitions 144. Multimodal command definition 144 may identify a combination of user actions (e.g., user input) that when present cause computing device 120 to initiate a computing action. The combination of user actions may be from any number of different modalities (e.g., 2, 3, or 4+modalities) and may include any number of actions corresponding to each of the modalities. For example, the multimodal command definition may require a particular action received over the visual modality (e.g., particular hand gesture) and an action over the tactile modality (e.g., a particular keystroke or mouse click).

Command invocation component 126 may interact with multimodal analysis component 124 and may initiate a computing action. The computing action may involve initiating the execution of one or more computing tasks, functions, operations, instructions, other action, or a combination thereof. The computing action may be initiated by computing device 120 and may be executed on computing device 120, other computing device (e.g., web server), or a combination thereof. In one example, the computing device with the human interface devices 130 that captured the user input may also be the computing device that initiates and executes the computing action.

Human interface devices 130 may be any type of interface device that is capable of sensing input of a human. Human interface devices 130 may capture sensory information from a surrounding environment or other source and transform the sensory information into sensory data. The sensory information may be analog signals (e.g., light, sound, movements) and the sensory data may be digital signals that can be processed, interpreted, or stored by computing device 120. Human interface devices 130 may enable computing device 120 to interpret sensory information that corresponds to one or more senses of a human, such as sight, hearing, touch, smell, or taste. Human interface devices 130 may be communicably coupled with computing device 120 and may be internal to the computing device (e.g., integrated sensors), external to the computing device (e.g., peripheral sensors), or a combination thereof.

Human interface devices 130 may include optical input devices 132A, acoustic input devices 132B, tactile input devices 132C, kinesthetic input devices 134D, other devices, or a combination thereof. Optical input device 132A may receive electromagnetic radiation (i.e., sensory information) at one or more portions of the electromagnetic spectrum (e.g., visible light, infrared, ultraviolet) and convert them to sensory data. Optical input devices 132A may include one or more still cameras, motion cameras (e.g., video cameras), scanners (e.g., image scanners) light sensors (e.g., ambient light sensors), or other optical device that is capable of transforming the electromagnetic radiation (e.g., sensory information) into image data. The image data may be in a two-dimensional or three-dimensional format and may be stored locally or remotely from the computing device 120. Acoustic input device 132B may receive acoustic information in the form of sound waves, ultrasonic waves, other vibrations, or a combination thereof and may convert them to sensory data (e.g., audio data). Acoustic input device 132B may include one or more microphones.

Tactile input device 132C may receive touch related input (i.e., sensory information) originating directly or indirectly from a user and may convert the input to sensory data that can be interpreted by computing device 120. Tactile input device 132C may include touch sensitive devices, pointing devices, keyboards, or a combination thereof. The touch sensitive devices may include touch pads, touch screens, other touch sensitive surface, or a combination thereof. The pointing devices may include a computer mouse, roller-ball, joystick, other device, or a combination thereof. The pointing device may receive user input in the form of clicks (e.g., mouse clicks), positioning information (e.g., location coordinates or motion vectors), or a combination thereof. The keyboards may include one or more keys (e.g., software or hardware keys) and may be integrated with a touch sensitive device or a pointing device and receive input from a user and convert it to sensory data (e.g., key strokes, mouse clicks).

Kinesthetic input device 132D may detect the motion of the computing device and/or user and convert it to sensory data that can be interpreted by computing device 120. Kinesthetic input device 132D may detect a movement, an orientation, a location, other motion related sensory information, or a combination thereof. Kinesthetic input device 132D may include one or more accelerometers, gyroscopes, proximity detector, other device or a combination thereof.

Human interface devices 130 may also include other types of input devices that may or may not conform to a particular human sense. In one example, human interface devices 130 may include interface devices that relate to the human sense of taste or smell. In other examples, human interface devices 130 may involve detecting and interpreting human thoughts. This may involve the use of an interface device that includes a direct or indirect communication pathway with a brain of the user, such as, a brain-computer interface (BCI), mind-machine (MMI), direct neural interface (DNI), other device, or a combination thereof. The human interface devices 130 discussed above may each correspond to a unique modality and therefore computing device 130 may be capable of handling input over multiple different computing input modalities 134

Computing input modalities 134 are classifications of independent channels of sensory input between a computer and a human and may correspond to the human interface devices 130 discussed above. A computer system may be unimodal if the computer system receives input over a single modality or may be multimodal if the computer system receives input over multiple different modalities. Multiple modalities may be used to provide complementary methods to initiate commands and may enrich a user's ability to communicate with computing device 120. As shown in FIG. 1, computing input modalities 134 may include a visual modality 134A, an auditory modality 134B, a tactile modality 134C, and a kinesthetic modality 134D.

Visual modality 134A may involve receiving visual input using one or more optical input devices 132A and analyzing the visual input using computer vision technology. The computer vision technology may enable computing device 120 to detect the movement or lack of movement of one or more portions of a user's body. The portions may include a hand, a head, a face, an eye, a mouth, other portion of a human body, or combination thereof. The movements of the body may be used to communicate and may include hand movement (e.g., gestures, sign language), head movement (e.g., nodding), face movement (e.g., smiling, pouting), eye movements (e.g., winking, gazing), mouth movements (e.g., lip reading), other movements, or a combination thereof. The computer vision technology may also involve optical character recognition (OCR) and enable computing device 120 to detect symbols in the form of printed or handwritten textual input.

Auditory modality 134B may involve receiving audio input using one or more acoustic input devices 132B and analyzing the audio input using speech recognition and/or voice recognition technology. The speech recognition technology may enable computing device 120 to detect and distinguish between different sounds received from a user. The speech sounds may include phonetic sounds (e.g., words, phrases), emotional sounds (e.g., laughter, crying), musical sounds (e.g., clapping, humming), animal or human sounds, other sounds, or a combination thereof.

Tactile modality 134C may involve receiving touch input using one or more tactile input devices 132C and analyzing the tactile input to detect user input. As discussed above, a mouse and keyboard may both be forms of tactile input devices 132C and may therefor both be included within the same tactile modality 134C.

Kinesthetic modality 136D may involve receiving motion input using one or more kinesthetic input devices 134D and analyzing the motion related input to identify motion of the computing device and/or user. In other examples, computing device 120 may support other modalities that are based on other forms of human-computer interaction such as gustation (e.g., taste), olfaction (e.g., smell), thermoception (e.g., heat), noniception (e.g., pain), equilibrioception (e.g., balance), or cognitive detection (e.g., thought identification).

Data store 140 may be a memory (e.g., random access memory), a drive (e.g., a hard drive), a flash drive, a database system, or other type of component or device capable of storing data. The data store 140 may also include multiple storage components (e.g., multiple drives or multiple databases) that may also span multiple computing devices (e.g., multiple server computers). Data store 140 may be directly accessible (e.g., local) or indirectly accessible (e.g., over a network) by computing device 120.

Figure 2:
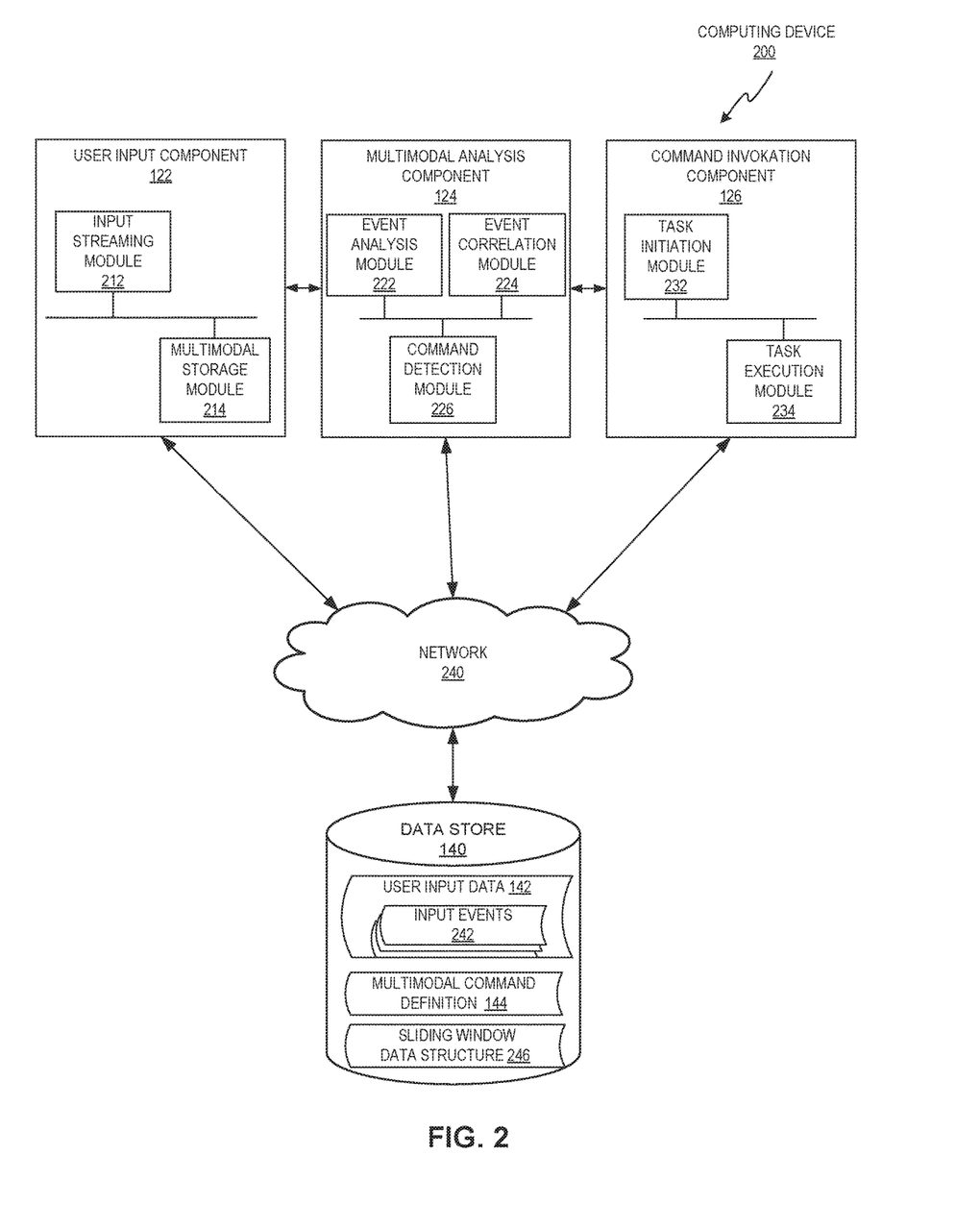
FIG. 2 is a block diagram illustrating aspects of a computing device according to some implementations.

FIG. 2 depicts a block diagram illustrating an exemplary computing device 120 that includes multimodal command detection technology that may enhance human-computer interactions, in accordance with aspects of the disclosure. Computing device 120 may be the same or similar to computing device 120 of FIG. 1 and may include a user input component 122, a multimodal analysis component 124, and a command invocation component 126. More or less components or modules may be included without loss of generality. For example, two or more of the components may be combined into a single component, or features of a component may be divided into two or more components. In one implementation, one or more of features of a component may be executed on different computing devices (e.g., a client device and a server device).

User input component 122 may interact with one or more human interface devices to receive user input and store the user input in data store 140 for subsequent processing. In one example, user input component 122 may include an input streaming module 212 and a multimodal storage module 214.

Input streaming module 212 may receive user input data 142 (e.g., sensory data) over one or more input channels. In one example, each of the input channels may correspond to a particular computing input modality or may correspond to a particular human interface device. For example, an input channel may correspond to a particular modality (e.g., tactile modality). In another example, each input channel may correspond to a particular human interface device (e.g., mouse or keyboard) and a single modality may correspond to multiple separate input channels.

Multimodal storage module 214 may access input data received by input streaming module 212 and may store the user input as one or more input events 242. Input events 242 may correspond to the optical input, acoustic input, tactile input, kinesthetic input, or other input events discussed above. In one example, input events 242 may be generated by the human interface devices in response to processing sensory information and sent to input streaming module 212. In another example, the input events 242 may be generated by multimodal storage module 214 in response to sensory data received by input streaming module.

Input events 242 may be data structures that represent, store, or organize data that originated from a human interface device and may correspond to one or more actions initiated by a user. The actions may have been captured over one or more modalities and may include keyboard strokes, mouse clicks, camera based hand gestures, touch based hand gestures, spoken words, other actions, or a combination thereof. Each of the input events 242 may include temporal data (e.g., time stamp), action data (e.g., image data, audio data, tactile data), human interface device data (e.g., device identifier), modality data (e.g., modality identifier), other data, or a combination thereof.

Multimodal analysis component 124 may analyze input events 242 to determine whether the input events 242 satisfy one or more multimodal command definitions 144. In the example shown in FIG. 2, multimodal analysis component 124 may include an event analysis module 222, an event correlation module 224, and a command detection module 226.

Event analysis module 222 may analyze input events to determine or derive the actions performed by the user. The analysis of input events 242 may be based on the modality of the input event and events from different modalities may be analyzed using the same or different technology. In one example, input events 242 that are related to a visual modality may be analyzed using computer vision technology and input events 242 that are related to an auditory modality may be analyzed using speech recognition technology. Input events 242 corresponding to other modalities may be analyzed using respective recognition technologies.

Event correlation module 224 may analyze the input events from one or more modalities and correlate the input events with one another. Correlating input events 242 may involve filtering, aligning, grouping, other organizational process, or a combination thereof on the one or more input events 242. Filtering the input events 242 may involve removing one or more input events based on any type of input event data (e.g., temporal data) and may reduce the quantity of input events available for subsequent analysis. Aligning input events 242 may involve temporally aligning input events 242 based on when the input events 242 or corresponding user actions were initiated, received, processed, completed, other time, or combination thereof. The aligning may involve a multistage sorting such that input events of one or more modalities are sorted in view of other input events of the same modality and then the sorted input events of a first modality are aligned with one or more sorted input events of a second modality.

Correlating the input events may also or alternatively involve event correlation module 224 identifying multiple input events that are related to the same user action and correlating these input events with one another to more closely correspond to a user action. The correlation may be done by associating these events with a common set of events (e.g., event group) or merging the multiple events into either a newly created input event or into one of the existing events.

Event correlation module 224 may correlate multiple input events associated with the same computing input modality. In one example, event analysis module 222 may analyze multiple input events corresponding to multiple image frames (e.g., video portions) received over a visual modality. Each image frame may include a portion of a user's hand and together the image frames may represent a particular hand movement (e.g., hand gesture). Event analysis may apply computer vision technology to identify a hand in each image frame and detect the beginning of a hand gesture and an end of a hand gesture. Event analysis module 222 may combine or associate one or more of these input events into a single input event or set of input events. In another example, event analysis module 222 may analyze multiple input events 242 corresponding to multiple sound clips (e.g., sound portions) originating over an auditory modality. Each sound clip may include a portion of speech of the user and together the sound clips may represent a particular word, phrase, sentence, other vocal expression (e.g., human utterance), or combination thereof. Event analysis may apply speech recognition technology to identify a portion of speech in each sound clip and detect the beginning of a vocal expression and an end of the vocal expression. Event analysis module 222 may combine one or more of the input events corresponding to the vocal expression into a single input event or set of events. In other examples, the same may apply to combining multiple input events of one of the other modalities.

Event correlation module 224 may also or alternatively correlate multiple input events across different computing input modality. This may enhance the detection of user actions because some user actions may produce input via multiple different modalities. For example, a multi-hand gestures (e.g., clapping) or human speech may produce visual changes and audio changes and correspond to input events from both the visual modality and the auditory modality respectively. The original input events, correlated input events, or a combination thereof may be analyzed by command detection module 226.

Command detection module 226 may compare input events 242 with one or more multimodal command definitions 144 to determine whether a multimodal command should be initiated. Traditional computing commands are initiated based on unimodal input such as a user clicking a graphical control item in a window dialog box or a user using speech to invoke a voice command. A multimodal command may be any computing command that is initiated based on user input received over multiple different modalities. A multimodal command may be an overlapping command (e.g., redundant command) and may initiate the same or similar computing action that can be initiated using an existing unimodal command (e.g., native unimodal command). In some examples, this may be referred to as a multimodal shortcut or a multimodal hotkey and has overlapping functionality but may or may not overlap the modality of the existing unimodal command. In other examples, the multimodal command may provide the only human-computer interaction that enables the computing function and no unimodal commands may be available to initiate the computing task.

Multimodal command definition 144 may be created or customized in response to user input of an end user, administrator, developer, designer, or other entity. Each multimodal command definition 144 may identify triggering conditions and corresponding computing actions for one or more multimodal commands. The triggering conditions may identify a combination of input events (e.g., user actions) that when present cause computing device to initiate a corresponding computing action. The combination of user actions may be from any number of different modalities (e.g., 2, 3, or 4+modalities) and may include any number of actions corresponding to each of the modalities. For example, the multimodal command definition may identify one or more particular actions received over the visual modality (e.g., particular hand gesture) and one or more particular actions over the tactile modality (e.g., a particular key stroke or mouse click).

Command detection module 226 may determine that multimodal command definition 144 is satisfied by using a sliding window. The sliding window may identify a subset of input events 242 that are analyzed together against the triggering condition of a multimodal command definition 144. Input events that are not within the sliding window may not be considered at that time for the purposes of triggering a multimodal command. The number of input events associated with the sliding window may change over time and some input events may be removed from the subset and new input events may be added to the subset.

The sliding window may be implemented using one or more sliding window data structures 246. A sliding window data structure 246 may be any data structure that is able to be associated with one or more input events 242 and may include a predetermined size (e.g., width) that is based on a duration of time (e.g., temporal size), a quantity of input events (e.g., spatial size), other size, or a combination thereof.

The sliding window may provide flexibility in the time or order of input events. This may be advantageous because user input received over different modalities may be processed at different rates because they may be subject to different processing delays. For example, the processing time for recognizing a tactile input (e.g., keystroke, mouse click) may be substantially less than the processing time to recognize acoustic input (e.g., speech recognition) or optical input (e.g., computer vision). The sliding window may account for this delay by treating the input events occurring within the bounds of the sliding window (e.g., temporal or quantity bounds) as eligible events to trigger a multimodal command and ignoring input events that are outside the bounds of the sliding window. In one example, the time of input events may be used to determine whether input events are associated with the sliding window subset, but once they are associated with the sliding window subset the time or order of occurrence may no long be used for determining whether the multimodal command definition has been fulfilled.

Command detection module 226 may use one or more sliding windows to determine whether a multimodal command definition has been fulfilled. A particular sliding window may include input events from only a single modality or may include input events from multiple different modalities. In one example, each modality or each input device of a modality may include its own sliding window or one or more of the modalities may share a sliding window. In another example, there may be a combination in which some of the modalities correspond to a single sliding window and other modalities that share a sliding window. In either example, the sliding windows may be layered and the results of a lower level (e.g., first level, fist layer) sliding window may be aggregated into an upper level (e.g., second level, second layer) sliding window. For example, the sliding windows of the lower level may be used to identify user actions for particular modalities and the sliding window of an upper level may identify user actions across the modalities and together they can be used to determine whether the multimodal command definition has been satisfied.

In a simplified example, command detection module 226 may include a first sliding window for a tactile modality (e.g., keyboard input) and a second sliding window for an auditory modality (e.g., speech input). The first sliding window may have a max size that is based on a quantity (e.g., x keystrokes) and the second sliding window may have a max size that is based on a duration of time (e.g., x seconds). Both the first and second windows may be used concurrently (e.g., parallel, simultaneous) for analyzing input events of the respective modalities.

The first sliding window may begin with a single input event, which may be any key stroke (e.g., "a") or combination of key strokes (e.g., "control+a"). The input event may be assigned a first position in the first sliding window (e.g., first element of subset). Command detection module 226 may analyze the triggering conditions of one or more multimodal command definitions to determine if the input events of the sliding window fulfill a triggering condition. If yes, the sliding window will advance (e.g., slide) to a next input event (e.g., keystroke "b") and continue the determination process. If no, the sliding window will be increased to include a subsequent input event (e.g., next keystroke "b") and try to match the new input event or the combination of the previous and new input events ("a" and then "b"). If there are no multimodal command definitions with matching triggering conditions the sliding window may add additional input events until it reaches the max input size (e.g., x input events). Once the max input size is reached, a subsequent failed match will result in the first input event being removed and a subsequent input event being added. As a result, the elements (e.g., input events) that were previously the second and third elements will become the first and second elements and the newest input event will become the third element of the slider windows subset. If there were a match for the combined input events then the combination of input events would be removed from the sliding window subset and one or more subsequent events may be added.

The second sliding window may function in a similar manner to the first sliding window and may begin with a single input event. The single input event may be any vocal expression (e.g., letter, syllable, word, or combination thereof). The input event may be assigned a first position in the second sliding window (e.g., first element of subset). Command detection module 226 may analyze the triggering conditions of one or more multimodal command definitions to see if the input events of the sliding window fulfill a triggering condition. If yes, the sliding window will advance (e.g., slide) to a next input event (e.g., next word) and continue the determination process. If no, the sliding window will be increased to include a subsequent input event (e.g., next word) and try to match the new input event or the combination of the previous and new input events (e.g., multiple spoken words). If there are no multimodal command definitions with matching triggering conditions the sliding window may add additional input events until it reaches the max input size (e.g., 10 second duration). Once the max input size is reached, a subsequent failed match will result in the first input event being removed and a subsequent input event being added. As a result, the elements (e.g., input events) that were previously the second and third positions would become the first and second positions and the newest element will become the third element of the slider windows subset. If there were a match for the combined input events then the combination of input events would be removed from the sliding window subset and subsequent events added.

Command detection module 226 may also or alternatively convert the input commands from modality specific input events to modality independent input events. The modality independent input events may be analyzed using a single sliding window or multiple sliding windows as discussed above. The modality independent input events may be the same or similar to input events 242 discussed above and may include action data that is modality independent. For example, three separate user actions may be received over three separate modalities. Each of the user actions may be represented by a different input event and each may be independently transformed to a modality independent input event.

In a simplified example, a user may select the "up" key, vocalize the word "up," and hand gesture an "up symbol" (e.g., raising hand with palm up). Each user action may be received by a different human interface device and produce respective input events. The input events may then be transformed by command detection module 226 to be the modality independent input events, such that, the action data of each of the modality independent inputs may be transformed (e.g., modified, redacted, supplemented) to be the same (e.g., identical) or similar to one another. For example, each of the modality independent input events may indicate the user action relates to an "up" action without specifying whether it was a key stroke, spoken word, or hand gesture. In one example, computing device 120 may be capable of determining the modality of the modality independent input events. In another example, computing device 120 may be incapable of determining the modality of the modality independent input events.

Command invocation component 126 may interact with multimodal analysis component 124 and may initiate a computing action corresponding to the multimodal command definition 144. In one example, command invocation component 126 may include a task initiation module 232 and a task execution module 234.

Task initiation module 232 may initiate the execution of one or more computing actions. The computing actions may be identified by the multimodal command definition and may include one or more computing functions, operations, instructions, other actions, or a combination thereof. The computing action may be initiated by computing device 120 or by another device that is operably coupled to computing device 120.

Task execution module 234 may manage the execution of the one or more computing actions on computing device 120, other computing device (e.g., web server), or a combination thereof. In one example, the computing device within the human interface devices 130 that captured the user input may be the computing device that initiates and executes the computing tasks. In another example, the computing device within the human interface devices 130 that captured the user input may not be either the computing device that initiates the computing task or the computing device that executes the computing task associated with the multimodal command definition.

Figure 3:
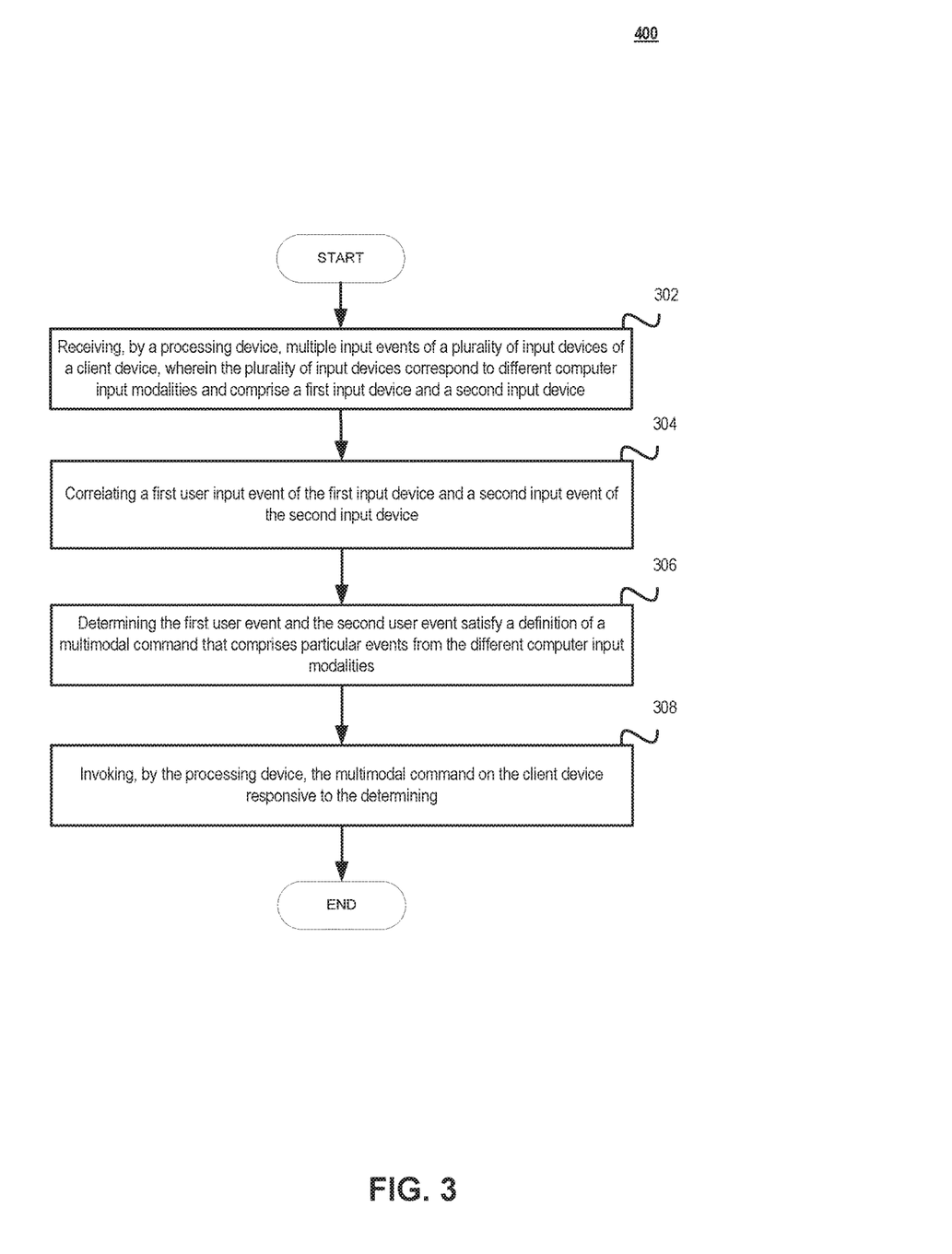
FIG. 3 is a flow diagram illustrating an exemplary operation of multimodal command detection technology according to some implementations.
Figure 4:
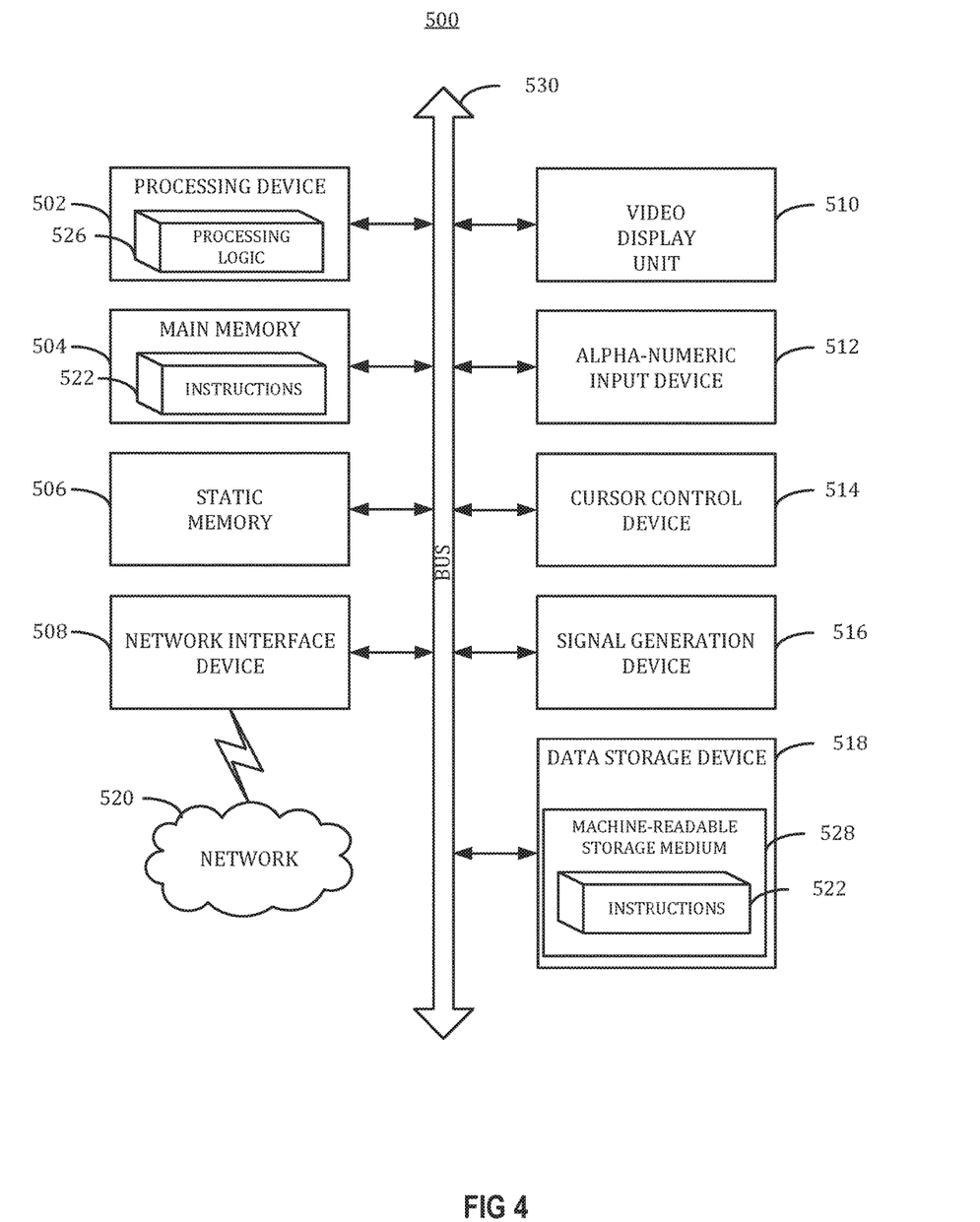
FIG. 4 is a diagrammatic representation of a machine in the exemplary form of a computer system configured to perform one or more of the operations described herein.

FIG. 3 depicts a flow diagram of example method 300 for detecting multimodal commands, in accordance with aspects of the disclosure. Method 300 may be performed by processing devices that may comprise hardware (e.g., circuitry, dedicated logic), software (such as is run on a general purpose computer system or a dedicated machine), or a combination of both. Method 300 and each of its individual functions, routines, subroutines, or operations may be performed by one or more processors of the computer device executing the method. In certain implementations, method 300 may each be performed by a single processing device. Alternatively, method 300 may be performed by two or more processing devices, each processing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 may be performed by computing device 120 of FIGS. 1 and 2.

Method 300 may be performed by processing devices of a server device or a client device and may begin at block 302. At block 302, a processing device may receive multiple input events of a plurality of input devices of a client device. The plurality of input devices may correspond to different computer input modalities and comprise a first input device and a second input device. The computer input modalities may include one or more of a visual modality, an auditory modality, a tactile modality, or a kinesthetic modality.

At block 304, the processing device may correlate a first user input event of the first input device and a second input event of the second input device. Correlating the first input event and the second input event may involve temporally aligning the input events with a sliding window, wherein the size of the sliding window is based on at least one of a quantity of input events or duration of time.

The multiple input events may represent multimodal user input received by at least two devices from a set of devices comprising an optical input device (e.g., optical capturing device), an acoustic input device (e.g., acoustic capturing device), and a touch input device (e.g., touch capturing device). In one example, the multiple input events may be received over a plurality of input streams (e.g., channels) that correspond to the different computing input modalities. In one example, a first input event may be received over an input stream for a first computer input modality and a second input event may be received over an input stream for a second computer input modality.

At block 306, the processing device may determine the first user event and the second user event satisfy a definition of a multimodal command that comprises particular events from the different computer input modalities. The determination may involve transforming the multiple input events from the plurality of input devices that correspond to the different computing input modalities to multiple input events that are modality independent.

At block 308, the processing device may invoke the multimodal command on the client device responsive to the above determination of block 306. The multimodal command may be created in response to user input identifying the particular events from the different computer input modalities. The multimodal command may overlap with a native unimodal command and invoke the same computing task initiated by the native unimodal command. Responsive to completing the functions of block 308, method 300 may terminate.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 may be comprised of a processing device 502, a main memory 504 (e.g., read-only memory (ROM), flash memory, dynamic random access memory (DRAM) (such as synchronous DRAM (SDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute processing logic 526 for performing the operations and steps discussed herein.

Computer system 500 may further include a network interface device 508. Computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 528 having one or more sets of instructions 522 (e.g., software) embodying any one or more of the methodologies or functions described herein. Instructions 522 may also reside, completely or at least partially, within main memory 504 and/or within processing device 502 during execution thereof by computer system 500; main memory 504 and processing device 502 also constituting machine-readable storage media. Instructions 522 may further be transmitted or received over a network 520 via network interface device 508.

Machine-readable storage medium 528 (e.g., computer-readable storage medium) may also be used to store instructions for managing a trust. While machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment described and shown by way of illustration is in no way intended to be considered limiting. Therefore, references to details of various embodiments are not intended to limit the scope of the claims, which in themselves recite only those features regarded as the invention.

What is claimed is:

1. A computer-implemented method comprising:
receiving, by a processing device, data structures storing data associated with multiple input events from a plurality of input devices of a client device, wherein the plurality of input devices correspond to different computer input modalities and comprise a first input device and a second input device;
correlating, by the processing device, a first input event to first data received from the first input device and a second input event to second data received from the second input device, wherein the correlating includes temporally aligning the first input event and the second input event with a sliding time window, wherein a size of the sliding time window is based on a quantity of the multiple input events during a duration of time;
transforming, by the processing device, the first data of the first input event into a modality independent action data;
transforming, by the processing device, the second data of the second input event into the modality independent action data;
determining, by the processing device analyzing the modality independent action data transformed from the first data and the second data, the first input event and the second input event satisfy a definition of a multimodal command that comprises particular events from the different computer input modalities; and
invoking, by the processing device, the multimodal command on the client device responsive to a determination that the first and second input events satisfy the definition of the multimodal command, wherein invoking includes initiating a computing action on the client device that is identified within the multimodal command.

2. The computer-implemented method of claim 1, wherein the computer input modalities comprise one or more of a visual modality, an auditory modality, a tactile modality, or a kinesthetic modality.

3. The computer-implemented method of claim 1, wherein the multiple input events represent multimodal user input received by at least two devices from a set of devices comprising an optical input device, an acoustic input device, and a touch input device.

4. The computer-implemented method of claim 1, wherein receiving the multiple input events comprises receiving the multiple input events over a plurality of input streams corresponding to the different computing input modalities.

5. The computer-implemented method of claim 1, wherein the multimodal command overlaps with a native unimodal command and the multimodal command and the native unimodal command invoke an identical computing task.

6. The computer-implemented method of claim 1, wherein the multimodal command is created in response to user input identifying the particular events from the different computer input modalities.

7. A computer-system comprising:
   a memory; and
   a processing device communicatively coupled to said memory, said processing device configured to:
      receive data structures storing data associated with multiple input events from a plurality of input devices of a client device, wherein the plurality of input devices correspond to different computer input modalities and comprise a first input device and a second input device;
      correlate a first input event to first data received from the first input device and a second input event to second data received from the second input device, including to temporally align the first input event and the second input event with a sliding time window, wherein a size of the sliding time window is based on a quantity of the multiple input events during a duration of time;
      transform the first data of the first input event into a modality independent action data;
      transform the second data of the second input event into the modality independent action data;
      determine, via analysis of the modality independent action data transformed from the first data and the second data, the first input event and the second input event satisfy a definition of a multimodal command that comprises particular events from the different computer input modalities; and
      invoke the multimodal command on the client device responsive to a determination that the first and second input events satisfy the definition of the multimodal command, wherein to invoke includes to initiate a computing action on the client device that is identified within the multimodal command.

8. The computer-system of claim 7, wherein the computer input modalities comprise one or more of a visual modality, an auditory modality, a tactile modality, or a kinesthetic modality.

9. The computer-system of claim 7, wherein the multiple input events represent multimodal user input received by at least two devices from a set of devices comprising an optical input device, an acoustic input device, and a touch input device.

10. The computer-system of claim 7, wherein to receive the multiple input events comprise the processing device to receive the multiple input events over a plurality of input streams corresponding to the different computing input modalities.

11. The computer-system of claim 7, wherein the multimodal command is created in response to user input identifying the particular events from the different computer input modalities.

12. A non-transitory computer-readable storage medium programmed to include instructions that, when executed by a processing device, cause the processing device to perform a plurality of operations comprising:
   receiving data structures storing data associated with multiple input events from a plurality of input devices of a client device, wherein the plurality of input devices correspond to different computer input modalities and comprise a first input device and a second input device;
   correlating a first input event to first data received from the first input device and a second input event to second data received from the second input device, wherein the correlating includes temporally aligning the first input event and the second input event with a sliding time window, wherein a size of the sliding time window is based on a quantity of the multiple input events during a duration of time;
   transforming the first data of the first input event into a modality independent action data;
   transforming the second data of the second input event into the modality independent action data;
   determining, by analyzing the modality independent action data transformed from the first data and the second data, the first input event and the second input event satisfy a definition of a multimodal command that comprises particular events from the different computer input modalities; and
   invoking the multimodal command on the client device responsive to a determination that the first and second input events satisfy the definition of the multimodal command, wherein invoking includes initiating a computing action on the client device that is identified within the multimodal command.

13. The non-transitory computer-readable storage medium of claim 12, wherein the computer input modalities comprise one or more of a visual modality, an auditory modality, a tactile modality, or a kinesthetic modality.

14. The non-transitory computer-readable storage medium of claim 12, wherein the multiple input events represent multimodal user input received by at least two devices from a set of devices comprising an optical input device, an acoustic input device, and a touch input device.

15. The non-transitory computer-readable storage medium of claim 12, wherein receiving the multiple input events comprises receiving the multiple input events over a plurality of input streams corresponding to the different computing input modalities.

16. The non-transitory computer-readable storage medium of claim 12, wherein correlating the first input event and the second input event comprises temporally aligning the input events with a sliding time window, wherein a size of the sliding time window is based on a quantity of input events.

* * * * *